(12) United States Patent
Hart et al.

(10) Patent No.: US 11,403,968 B2
(45) Date of Patent: Aug. 2, 2022

(54) ADVANCED SURGICAL SIMULATION

(71) Applicant: Applied Medical Resources Corporation, Rancho Santa Margarita, CA (US)

(72) Inventors: Charles C. Hart, Rancho Santa Margarita, CA (US); Tracy Breslin, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 92 days.

(21) Appl. No.: 14/602,424

(22) Filed: Jan. 22, 2015

(65) Prior Publication Data
US 2015/0132732 A1    May 14, 2015

Related U.S. Application Data

(62) Division of application No. 13/722,675, filed on Dec. 20, 2012, now Pat. No. 8,961,190.
(Continued)

(51) Int. Cl.
| G09B 23/34 | (2006.01) |
| G09B 23/28 | (2006.01) |
| G09B 23/30 | (2006.01) |

(52) U.S. Cl.
CPC ........... *G09B 23/34* (2013.01); *G09B 23/285* (2013.01); *G09B 23/30* (2013.01)

(58) Field of Classification Search
CPC ................................ G09B 23/30; G09B 23/34
See application file for complete search history.

(56) References Cited

U.S. PATENT DOCUMENTS

| 184,573 A | 11/1876 | Becker |
| 2,127,774 A | 8/1938 | Jacobson |

(Continued)

FOREIGN PATENT DOCUMENTS

| CA | 2 293 585 A1 | 12/1998 |
| CN | 2421706 Y | 2/2001 |

(Continued)

OTHER PUBLICATIONS

Textbook of Small Animal Surgery. Ed. D. Slatter. 3rd Ed., vol. 1. (2003), p. 146.*

(Continued)

*Primary Examiner* — Thomas J Hong
*Assistant Examiner* — Jennifer L Korb
(74) *Attorney, Agent, or Firm* — Thomas Nguyen; Patrick Ikehara

(57) ABSTRACT

A system for training a clinician in energy-based surgical techniques that advantageously does not require the simulated tissue to be electrically conductive is provided. The simulated tissue comprises one or more materials. A heat generator is configured in the shape of a medical instrument typically encountered in energy-based surgical procedures such as electrosurgery or electrocautery. The instrument delivers sufficient heat to melt at least one of the materials in order to simulate energy-based surgical techniques such as excising target material. The one or more materials are configured in the simulated tissue such that their relative thermoplasticity defines a predetermined surgical pathway of a desired clinical outcome.

29 Claims, 8 Drawing Sheets

Related U.S. Application Data

(60) Provisional application No. 61/578,080, filed on Dec. 20, 2011.

(56) References Cited

U.S. PATENT DOCUMENTS

| | | | |
|---|---|---|---|
| 2,284,888 A | 6/1942 | Arnell, Jr. | |
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A | 12/1973 | Rowan | |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A | 2/1983 | Palmer et al. | |
| 4,386,917 A | 6/1983 | Forrest | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,726,772 A | 2/1988 | Amplatz | |
| 4,737,109 A | 4/1988 | Abramson | |
| 4,767,333 A * | 8/1988 | Born | G09B 23/30 |
| | | | 434/262 |
| 4,789,340 A | 12/1988 | Zikria | |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,061,187 A | 10/1991 | Jerath | |
| 5,083,962 A | 1/1992 | Pracas | |
| 5,104,328 A | 4/1992 | Lounsbury | |
| 5,125,922 A * | 6/1992 | Dwyer | A61B 18/22 |
| | | | 606/10 |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,380,207 A | 1/1995 | Siepser | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,541,304 A | 7/1996 | Thompson | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,743,730 A | 4/1998 | Clester et al. | |
| 5,762,458 A | 6/1998 | Wang et al. | |
| 5,769,640 A | 6/1998 | Jacobus et al. | |
| 5,775,916 A | 7/1998 | Cooper et al. | |
| 5,785,531 A | 7/1998 | Leung | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A | 2/1999 | Hasson | |
| 5,873,863 A | 2/1999 | Komlosi | |
| 5,908,302 A | 6/1999 | Goldfarb | |
| 5,947,743 A | 9/1999 | Hasson | |
| 5,951,301 A | 9/1999 | Younker | |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,271,278 B1 | 8/2001 | Park et al. | |
| 6,336,812 B1 | 1/2002 | Cooper et al. | |
| 6,398,557 B1 | 6/2002 | Hoballah | |
| 6,413,264 B1 | 7/2002 | Jensen et al. | |
| 6,474,993 B1 * | 11/2002 | Grund | A61L 27/20 |
| | | | 434/262 |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,589,057 B1 | 7/2003 | Keenan et al. | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 * | 8/2004 | Toly | G09B 23/285 |
| | | | 434/262 |
| 6,817,973 B2 | 11/2004 | Merril et al. | |
| 6,820,025 B2 | 11/2004 | Bachmann et al. | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 | 9/2007 | Sakezles | |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,641,958 B2 * | 1/2010 | Berman | A61F 2/0063 |
| | | | 428/143 |
| 7,646,901 B2 | 1/2010 | Murphy et al. | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |
| 7,803,151 B2 | 9/2010 | Whitman | |
| 7,806,696 B2 | 10/2010 | Alexander et al. | |
| 7,819,799 B2 | 10/2010 | Merril et al. | |
| 7,833,018 B2 | 11/2010 | Alexander et al. | |
| 7,837,473 B2 | 11/2010 | Koh | |

(56) References Cited

U.S. PATENT DOCUMENTS

| | | |
|---|---|---|
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 * | 9/2013 | Nguyen .............. G09B 23/30 434/267 |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2003/0212396 A1 * | 11/2003 | Eggers .............. A61B 18/1482 606/41 |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0064781 | 3/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 * | 9/2005 | Stoianovici ............ G09B 23/28 434/262 |
| 2006/0046235 A1 | 2/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |

(56) References Cited

U.S. PATENT DOCUMENTS

| | | |
|---|---|---|
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |
| 2009/0246747 A1 | 1/2009 | Buckman, Jr. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0281536 A1* | 11/2009 | Beckman ............ A61B 5/0059 606/33 |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0193482 A1* | 8/2010 | Ow ..................... B23K 26/38 219/121.67 |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1* | 8/2011 | Trotta .................. B29C 39/006 434/267 |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |

(56) References Cited

U.S. PATENT DOCUMENTS

| | | |
|---|---|---|
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 | 8/1992 |
| DE | 44 14 832 | 11/1995 |
| DE | 19 71 6341 | 9/2000 |
| EP | 1 024 173 A1 | 8/2000 |
| EP | 1 609 431 A1 | 12/2005 |
| EP | 2 068 295 A2 | 6/2009 |
| EP | 2 218 570 A1 | 8/2010 |
| FR | 2 691 826 | 12/1993 |
| FR | 2 917 876 A1 | 12/2008 |
| GB | 2488994 A | 9/2012 |
| GN | 101528780 A | 9/2009 |
| JP | 10 211160 | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| PT | 106230 | 9/2013 |
| WO | WO 1994/06109 A1 | 3/1994 |
| WO | WO 1996/420076 A1 | 2/1996 |
| WO | WO 1998/58358 A1 | 12/1998 |
| WO | WO 1999/01074 A1 | 1/1999 |
| WO | WO 2000/036577 | 6/2000 |
| WO | WO 2002/038039 A2 | 5/2002 |
| WO | WO 2002/038039 A3 | 5/2002 |
| WO | WO 2004/32095 A1 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 | 6/2007 |
| WO | WO 2008/021720 A2 | 2/2008 |
| WO | WO 2008/103383 A1 | 8/2008 |
| WO | WO 2009/000939 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

European Patent Office, International Search Report for International Application No. PCT/US2011/053859 A3, dated May 4, 2012, entitled "Portable Laparoscopic Trainer".
European Patent Office, International Search Report for International Application No. PCT/US2011/053859 A3, dated Apr. 5, 2012, entitled "Portable Laparoscopic Trainer".
European Patent Office, The International Search Report and Written Opinion for International Application No. PCT/US2012/60997, dated Mar. 7, 2013, entitled "Simulated Tissue Structure for Surgical Training".
European Patent Office, The International Search Report and Written Opinion for International Application No. PCT/US2012/070971, dated Mar. 18, 2013, entitled "Advanced Surgical Simulation".
Human Patient Simulator, Medical Education Technologies, Inc., http://www.meti.com (1999) all.
The International Bureau Of WIPO, International Preliminary Report on Patentability for International Application No. PCT/US2011/053859, titled "Portable Laparoscopic Trainer" dated Apr. 2, 2013.
European Patent Office, The International Search Report and Written Opinion for International Application No. PCT/US2012/070971, dated Jul. 4, 2014, entitled "Advanced Surgical Simulation Constructions And Methods".
The International Bureau Of WIPO, International Preliminary Report on Patentability for International Application No. PCT/US2012/070971, titled "Advanced Surgical Simulation" dated Jun. 24, 2014.

(56) References Cited

OTHER PUBLICATIONS

The International Bureau Of WIPO, International Preliminary Report on Patentability for International Application No. PCT/US2012/060997, titled "Simulated Tissue Structure For Surgical Training" dated Apr. 22, 2014.
European Patent Office, International Search Report and Written Opinion for International Application No. PCT/US2013/053497 titled "Simulated Stapling and Energy Based Ligation for Surgical Training" dated Nov. 5, 2013.
European Patent Office, The International Search Report and Written Opinion for International Application No. PCT/US2013/062363, dated Jan. 22, 2014, entitled "Surgical Training Model for Laparoscopic Procedures."
European Patent Office, The International Search Report and Written Opinion for International Application No. PCT/US2013/061949, dated Feb. 17, 2014, entitled "Surgical Training Model for Laparoscopic Procedures."
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, dated Feb. 17, 2014, entitled "Surgical Training Model for Transluminal Procedures."
European Patent Office, The International Search Report and Written Opinion for International Application No. PCT/US2013/061557, dated Feb. 10, 2014, entitled "Surgical Training Model for Laparoscopic Procedures."
European Patent Office, The International Search Report and Written Opinion of the International Searching Authority for International Application No. PCT/US2014/048027 titled "First Entry Model", dated Oct. 17, 2014.
European Patent Office, The International Search Report and Written Opinion for International Application No. PCT/US2013/061728 dated Oct. 18, 2013, entitled "Surgical Training Model for Laparoscopic Procedures."
Limps and Things, EP Guildford MATTU Hernia Trainer, http://limbsandthings.com/us/products/tep-guildford-mattu-hernia-trainer/.
Simulab, Hernia Model, http://www.simulab.com/product/surgery/open/hernia model.
McGill Laparoscopic Inguinal Hernia Simulator, Novel Low-Cost Simulator for Laparoscopic Inguinal Hernia Repair.
University of Wisconsin-Madison Biomedical Engineering, Inguinal Hernia Model, http://bmedesign.engr.wisc.edu/projects/s10/hernia_model/.
Kurashima Y et al, "A tool for training and evaluation of Laparoscopic inguinal hernia repair; the Global Operative Assessment of Laparoscopic Skills—Groin Hernia" American Journal Of Surgery, Paul Hoeber, New York, NY, US vol. 201, No. 1, Jan. 1, 2011, pp. 54-61 XP027558745.
The International Bureau Of WIPO, International Preliminary Report on Patentability for International Application No. PCT/US2013/062363, titled Surgical Training Model for Laparoscopic Procedures, dated Apr. 9, 2015.
The International Bureau Of WIPO, International Preliminary Report on Patentability for International Application No. PCT/US2013/062269, titled Surgical Training Model for Laparoscopic Procedures, dated Apr. 9, 2015.
The International Bureau Of WIPO, International Preliminary Report on Patentability for International Application No. PCT/US2013/061557, titled Surgical Training Model for Laparoscopic Procedures, dated Apr. 9, 2015.
The International Bureau Of WIPO, International Preliminary Report on Patentability for International Application No. PCT/US2013/061728, titled Surgical Training Model for Laparoscopic Procedures, dated Apr. 9, 2015.

The International Bureau Of WIPO, International Preliminary Report on Patentability for International Application No. PCT/US2013/061949, titled Surgical Training Model for Laparoscopic Procedures, dated Apr. 9, 2015.
European Patent Office, The International Search Report and Written Opinion for International Application No. PCT/US2015/022774, dated Jun. 11, 2015 entitled "Simulated Dissectible Tissue."
European Patent Office, The International Search Report and Written Opinion of the International Searching Authority for International Application No. PCT/US2014/038195 titled "Hernia Model", dated Oct. 15, 2014.
The International Bureau Of WIPO, International Preliminary Report on Patentability, for PCT application No. PCT/US2013/053497, titled, Simulated Stapling And Energy Based Ligation For Surgical Training, dated Feb. 12, 2015.
European Patent Office, The International Search Report and Written Opinion for International Application No. PCT/US2015/020574, titled "Advanced First Entry Model for Surgical Simulation," dated Jun. 1, 2015.
European Patent Office, The International Search Report and Written Opinion for International Application No. PCT/US2014/042998, title; Gallbladder Model, dated Jan. 7, 2015.
Anonymous: Silicone rubber—from Wikipedia, the free encyclopedia, pp. 1-6, XP055192375, Retrieved from the Internet: URL:http://en.wikipedia.org/w.index.php?title=Silicone rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau Of WIPO, International Preliminary Report on Patentability for International Application No. PCT/US2014/038195, titled Hernia Model, dated Nov. 26, 2015.
The International Bureau Of WIPO, International Preliminary Report on Patentability for International Application No. PCT/US2014/019840, titled Simulated Tissue Structure For Surgical Training, dated Sep. 11, 2015.
The International Bureau Of WIPO, International Preliminary Report on Patentability for International Application No. PCT/US2014/042998, titled "Gallbladder Model" dated Dec. 30, 2015.
The International Bureau Of WIPO, International Preliminary Report on Patentability for International Application No. PCT/US2014/048027, titled "First Entry Model" dated Feb. 4, 2016.
Society of Laparoendoscopic Surgeons, "Future Technology Session: The Edge of Innovation in Surgery, Space, and Business" http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2015/059668 titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for Interna-

(56) References Cited

OTHER PUBLICATIONS tional Application No. PCT/US2016/036664 titled "Hysterectomy Model", dated Aug. 19, 2016, 15 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf , printed Aug. 23, 2016, pp. 1-6.
3D-MED Corporation, "Loops and Wire #1" https://www.3-dmed.com/product/loops-and-wire-1, printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau Of WIPO, International Preliminary Report on Patentability and Written Opinion for International Application No. PCT/US2015/059668, entitled "Simulated Tissue Models and Methods," dated May 26, 2017, 16 pgs.
The International Bureau Of WIPO, International Preliminary Report on Patentability for International Application No. PCT/US2016/018697, entitled "Simulated Tissue Structures and Methods," dated Aug. 31, 2017, 14 pgs.
The International Bureau Of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau Of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
The International Bureau Of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau Of WIPO, International Preliminary Report on Patentability for International Application No. PCT/US2016/034591, entitled "Surgical Training Model for Laparoscopic Procedures," dated Dec. 7, 2017, 2017, 14 pgs.
European Patent Office, The International Search Report and Written Opinion for International Application No. PCT/US2017/039113, entitled "Simulated Abdominal Wall," dated Aug. 7, 2017, 13 pgs.
The International Bureau Of WIPO, International Preliminary Report on Patentability for International Application No. PCT/US2016/036664, entitled "Hysterectomy Model," dated Dec. 21, 2017, 10 pgs.
The International Bureau Of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau Of WIPO, International Preliminary Report on Patentability for International Application No. PCT/US2016/043277, entitled "Appendectomy Model," dated Feb. 1, 2018, 9 pgs.
The International Bureau Of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau Of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," dated Jun. 8, 2018, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau Of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau Of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.
European Patent Office, Extended European Search Report for European Patent Application No. EP 19159065.2, titled "Simulated Tissue Structures and Methods," dated May 29, 2019, 8 pgs.
The International Bureau Of WIPO, International Preliminary Report on Patentability for International Application No. PCT/US2018/018036, entitled "Laparoscopic Training System," dated Aug. 29, 2019, 8 pgs.
The International Bureau Of WIPO, International Preliminary Report on Patentability for International Application No. PCT/US2018/

(56) References Cited

OTHER PUBLICATIONS 018895, entitled "Synthetic Tissue Structures for Electrosurgical Training and Simulation," dated Sep. 6, 2019, 7 pgs.

European Patent Office, Extended European Search Report for European Patent Application No. EP 20153338.7, titled "Advanced Surgical Simulation Constructions and Methods," dated Mar. 5, 2020, 7 pgs.

European Patent Office, Extended European Search Report for European Patent Application No. EP 19215545.5, titled "Advanced First Entry Model for Surgical Simulation," dated Mar. 26, 2020, 8 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/ Surgical_Female_Pelvic_Trainer_SFPT_with_Advanced_Uterus_User_Guide.pdf, retrieved Feb. 21, 2020, 2 pgs.

European Patent Office, Extended European Search Report for European Patent Application No. EP 20158500.7, titled "Surgical Training Device," dated May 14, 2020, 9 pgs.

European Patent Office, Extended European Search Report for European Patent Application No. EP 20186713.2, titled "Simulated Dissectible Tissue," dated Nov. 10, 2020, 12 pgs.

European Patent Office, Extended European Search Report for European Patent Application No. 21159294.4, titled "Surgical Training Model for Laparoscopic Procedures," dated Apr. 5, 2021, 7 pgs.

European Patent Office, Extended European Search Report for European Patent Application No. EP 21182654.0, titled "Simulated Dissectible Tissue," dated Oct. 22, 2021, 13 pgs.

Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.

Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.

\* cited by examiner

ADVANCED SURGICAL SIMULATION

CROSS-REFERENCE TO RELATED APPLICATION

This application is a divisional of U.S. patent application Ser. No. 13/722,675 entitled "Advanced surgical simulation" filed on Dec. 20, 2012 which claims priority to and benefit of U.S. Provisional Patent Application Ser. No. 61/578,080 entitled "Advanced surgical simulation" filed on Dec. 20, 2011, all of which are incorporated herein by reference in its entireties.

FIELD OF THE INVENTION

The present invention is directed to medical training and simulation systems and devices that provide a user with visual, tactile and technical properties that emulate the situations extant in live surgical procedures.

BACKGROUND

Many surgical procedures involve the use of energy-based surgical instruments such as electrosurgical blades, probes, scissors, graspers, dissectors, electrocautery instruments and the like. Generally, electrosurgery is performed using an electrosurgical generator connected to an alternating current power supply and an instrument including one or more electrodes. Voltage is provided by the generator and high-frequency electric current typically in the range of 200 kHz to 3.3 MHz is delivered to biological tissue through the electrode tip of the instrument or handpiece as a means to cut, coagulate, desiccate or fulgurate tissue. As the current is delivered, it passes through and heats the tissues to create the desired clinical effect. Alternatively, the electrical current is used to heat an instrument and a clinical effect is realized when the heated instrument is applied to tissue as in electrocautery. Additionally, many procedures make use of energy devices based on high frequency sound also known as ultrasound devices. These and other energy-based instruments advantageously provide a surgeon with the ability to make precise and nearly effortless cuts, dissect tissue and nearly instant thermal hemostasis limiting blood loss. Such instruments have become a standard within the surgical community and are used regularly in a variety of procedures.

Because of the effectiveness of electrosurgical and other energy-based instruments and procedures, it is important to train the clinician in the use of energy-based surgical instruments and procedures. Many of the existing training or simulating modules use live tissue from animals or cadavers. Real live tissue may be expensive and difficult to obtain, requires preservation using refrigeration and generates a smoke plume and odor when cauterized. With real tissue, a grounding plate is attached to an electrosurgical generator and the grounding plate is placed underneath the patient so that the current penetrates deeper into the tissues. In general, the practice of electrosurgical techniques using real tissue requires additional safety considerations. Alternatively, in some simulation modules, synthetic materials that mimic the characteristics of living tissue are also employed in place of real tissue. Some of these synthetic materials that mimic the look and feel of real tissue include silicone elastomers, natural latex, polyurethane elastomers and styrenic-block copolymers. In order to serve as simulated tissue for practicing the use of energy-based surgical instruments, synthetic organ models must be wetted or infused with saline solution or embedded with materials such as metallic particles so that they are electrically conductive. Generally, the elastomeric materials are dielectric unless specially treated to conduct electric current. However, the most preferred synthetic materials such as silicone rubber, latex, vinyl, polyester, polyurethane and the like do not respond to energy-based surgical devices in a way that satisfies the need to train users to use the devices in an actual surgical procedure. Hence, there is a need to provide a system and method for simulating energy-based instruments that employs non-living, non-electrically conductive simulation tissue, yet simulates electrically conductive, living tissue for the practice of techniques used in electrosurgery, electrocautery and other energy-based systems. In order to simplify training and minimize the use of cadavers in surgical training, the present invention uses synthetic, materials that are compounded, configured and combined to emulate the properties, responses and characteristics of human or animal tissue under surgical conditions and in response to the activities of energy-based instruments. Such conditions and activities may include incision, penetration, dissection, occlusion, anastamosis, approximation, ablation, and the like.

SUMMARY

According to one aspect of the invention, a device for simulating energy-base surgical techniques is provided. The device includes a synthetic anatomical tissue structure comprising a base material having a first melting temperature forming a base layer, a subject material having a second melting temperature forming a subject layer connected to the base layer, and a target material having a third melting temperature forming a target layer connected to the subject layer. The system further includes a heat-generating instrument configured to deliver heat to melt the subject material.

According to another aspect of the invention, a device for training energy-based surgical techniques that does not require simulated tissue to conduct electricity is provided. The device comprises simulated tissue comprising two materials having different melting temperatures and a heat generator in the shape of a medical device. The heat generator is configured to deliver sufficient heat to melt the material with the lower melting temperature but not high enough to melt the material having the higher melting temperature in order to simulate energy-based surgical techniques such as electrocautery or electrosurgery.

According to another aspect of the invention, a method for simulating energy-based surgical techniques in a training environment is provided. The method includes the step of using a simulated tissue structure comprising a first material having a first melting temperature and a second material having a second melting temperature wherein the second melting temperature is higher than the first melting temperature and wherein the first and second materials are configured such that the second material is excisable from the first by melting the at least a portion of the first material. The method further includes the step of using a simulated energy-based surgical instrument configured to deliver heat at its distal end sufficient to melt the first material but not sufficient to melt the second material. The method further includes the step of melting the first material with the simulated energy-based surgical instrument. The method further includes the step of removing the second material with respect to the first material.

According to another aspect of the invention a device for training energy-based surgical techniques is provided. The device includes a synthetic anatomical structure comprising a first material having a first melting temperature and a second material connected to the first material. The first material and the second material are configured such that the second material is removable from the first material upon melting at least a portion of the first material. The device further includes a heat-generating instrument configured to deliver heat to melt the first material.

According to another aspect of the invention, a method for simulating energy-based surgical techniques is provided. The method includes the step of providing a simulated tissue structure comprising a first thermoplastic material having a first melting temperature. The method further includes the step of providing a simulated surgical instrument configured to generate heat to thermoplastically deform the first material. At least a portion of the first material is heated with the heat generator and thermoplastically deformed with the heat generator.

According to another aspect of the invention, a system for simulating energy-based surgical techniques is provided. The system includes a simulated tissue structure comprising a first material having a first melting temperature and a second material connected to the first material. The first material and the second material are configured such that the second material is removable from the first material upon melting at least a portion of the first material. The system includes a heat-generating instrument in the shape of a medical device encountered in energy-based surgical procedures and configured to deliver heat to melt the first material.

According to another aspect of the invention, the present invention provides an energy-based device that is configured to cooperate with certain preferred synthetic tissue materials to provide an emulation of energy based surgical activity at a greatly reduced cost and complexity as compared with the use of harvested, preserved tissue or infused synthetic materials.

According to another aspect of the invention, a non-living, non-electrically conductive simulated tissue structure is provided that simulates electrically conductive, living tissue for the practice of techniques used in electrosurgery, electrocautery and other energy-based systems. A heat generating device that mimics a medical device encountered in actual energy-based systems is configured to generate heat sufficient to thermoplastically deform at least one thermoplastically deformable material comprising the simulated tissue structure. The at least one thermoplastically deformable material is arranged relative to at least one second material so as to define at least one predetermined pathway to be following with the heat generating device in the practice of energy-based surgical methods and procedures. At least one of the predetermined pathways defines a successful clinical outcome and the at least one second material has a melting or softening temperature that is substantially unaffected by the heat generated by the heat generating device or otherwise does not have a melting temperature or is not thermoplastically deformable.

DETAILED DESCRIPTION OF THE PREFERRED EMBODIMENTS

Figure 1:
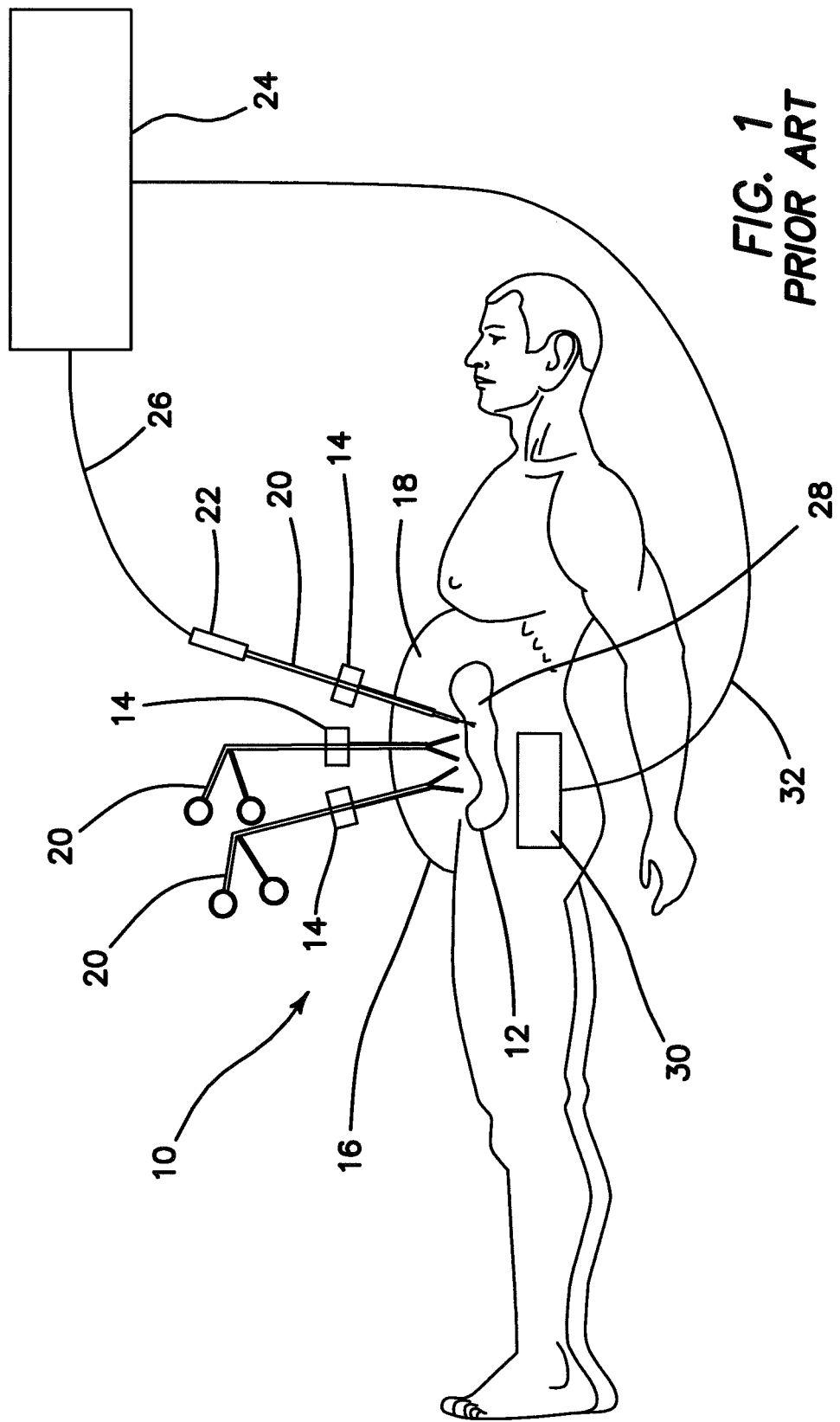
FIG. 1 is an illustration of a typical laparoscopic surgical procedure with electrosurgery.

With reference to the drawings, FIG. 1 illustrates a typical laparoscopic setup 10 where access to internal body organs 12 is provided by one or more access port 14 placed through a body wall 16 and into a body cavity 18. Various elongate surgical instruments 20 are placed through the one or more access port 14 and into the body cavity 18 to manipulate internal organs or structures 12. Special attention is directed to a variety of surgical instruments 20, in particular, energy-based instruments 22 such as but not limited to electrosurgical instruments 22 or electrocautery instruments that are connected to an energy source 24 for use in surgery. In particular, electrosurgery involves the application of high voltage, high frequency electrical energy to tissue for the purpose of cutting, destroying, coagulating, desiccating, or fulgurating tissue. Its benefits include the ability to make precise cuts with limited blood loss. In living tissue, an electrosurgical instrument 22 may be connected so that energy is directed through tissue to heat tissue via the electric current and create a "cutting" event at the location where the instrument 22 contacts the tissue. For example, an electrosurgical instrument 22 such as scissors, a grasper or knife may be employed to cut, divide or cauterize living tissue via the delivery of energy through the instrument 22. The electrosurgical instrument 22 is connected to an energy source 24. The energy source 24 generally comprises an electrosurgical generator that provides a very high voltage and high frequency current. The electrosurgical generator is typically connected to an alternating current source (not shown). A wire 26 connects the electrosurgical generator to the electrosurgical instrument 22 and is configured for delivering the appropriate current to the electrosurgical instrument 22. The electrosurgical arrangement 10 depends on the tissue 12 being electrically conductive as is the case with living tissue. The current is directed to a target location 28 where the electrosurgical "cutting" event occurs. The electrical discharge is then dissipated through the adjacent tissue and is returned to the generator through a grounding electrode or patch 30 that is secured to the underside of the tissue with a conductive adhesive. The electrode patch 30 serves as the return anode that would typically be placed underneath the patient's back during surgery. The circuit is completed with a wire connection 32 to the grounding portion of the electrosurgical generator 24.

Figure 2:
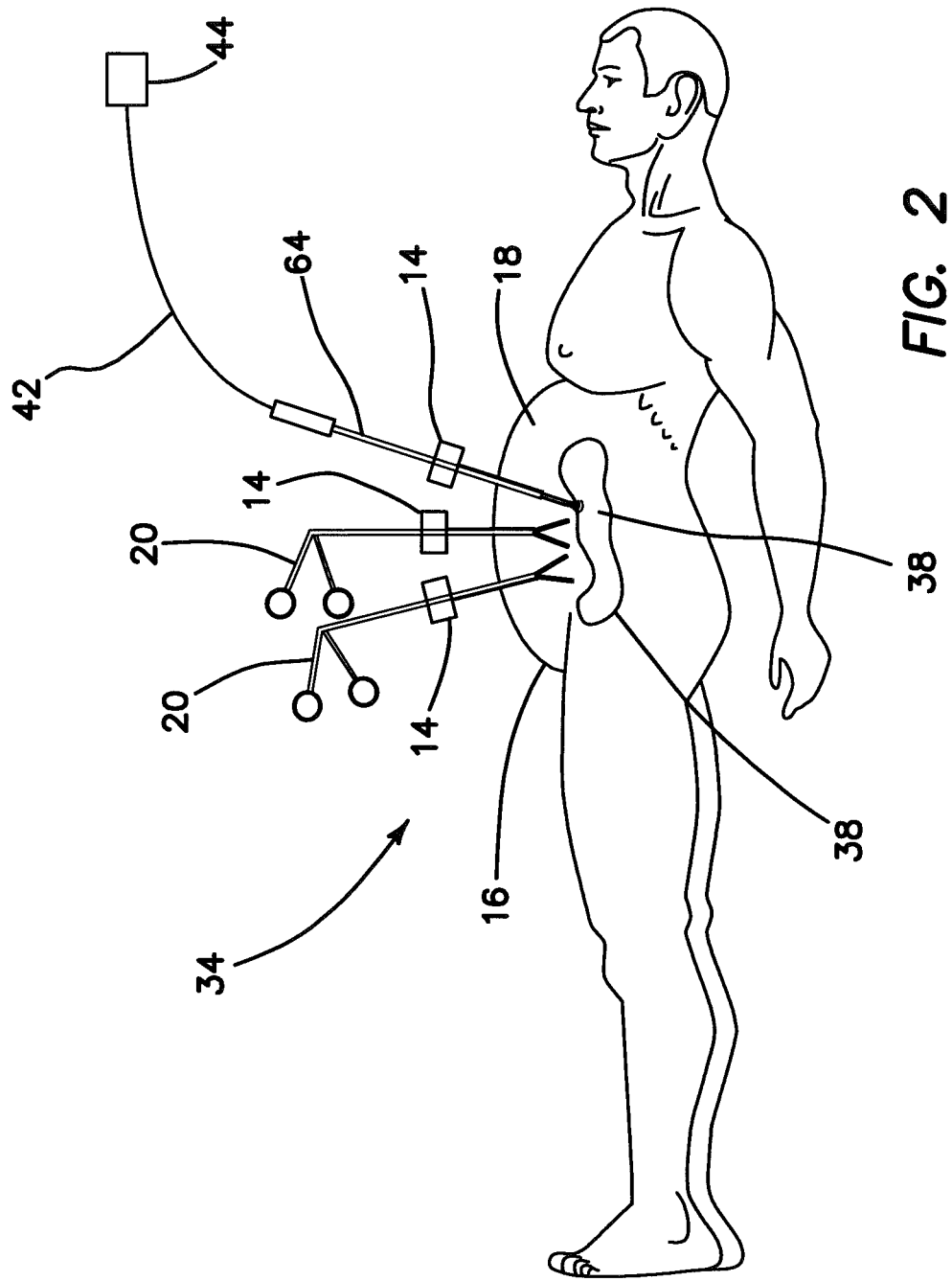
FIG. 2 is an illustration of a laparoscopic mannequin with simulated energy-based surgery according to the present invention.

Turning now to FIG. 2 a synthetic laparoscopic mannequin 34 is shown where a body form is constructed from synthetic, non-electrically conductive, materials such as plastic, rubber, wood, cloth or the like. Materials may be selected and combined to simulate a living body and living internal organs. It becomes apparent that a synthetic laparoscopic surgical mannequin 34 made of non-electrically conductive materials prevents the use of an actual electrosurgical arrangement that requires the target simulated tissue to be conductive. A simulated electrosurgical arrangement of the present invention includes a heat-generating instrument 64 that is configured to act upon simulated tissue 38 that comprises at least a portion of meltable synthetic simulated tissue 38 that is combinable with non-meltable synthetic tissue. Simulated tissue may include, skin, fascia, muscle, fat, connective, organ bed, organs, tumors, bone, veins, arteries and any other representation of human or non-human tissue with at least part of the simulated tissue comprising a meltable material. In one variation, all of the aforementioned tissues or organs are constructed of a combination of meltable and non-meltable synthetic materials. In another variation, the simulated tissue is all constructed of meltable synthetic materials. In yet another variation, the simulated tissue is constructed of two or more synthetic materials having different melting temperatures. The heated laparoscopic simulated electrosurgical heat-generating instrument 64 is configured to resemble an elongate probe, scissor, knife, grasper, dissector or may take the form of any other real medical device. The simulation heat-generating instrument 64 is electrically connected via a wire 42 to an electric power source 44. A grounding circuit including a grounding electrode or patch 30 is not required because the simulated tissue 38 is advantageously not constructed of electrically conductive material. Furthermore, the power source 44 can be an alternating current source or advantageously a direct current source that permits the training construct to be easily portable for demonstration or practice with a battery residing in the handle of the heat-generating instrument 64 avoiding the interference from the wire 42. A battery may also reside external to the heat-generating instrument 64. Other surgical instruments 20 including the simulation heat-generating instrument 64 are shown inserted into the one or more access port 14 to perform surgical procedures laparoscopically with live images captured via a laparoscope also inserted through an access port 14 and displayed on a video monitor for the surgeon to observe. The one or more access port 14 is placed through a body wall 16 and into a body cavity 18 distended with insufflation gas to create an operative space accessible via the minimally invasive access devices 14.

Figure 3:
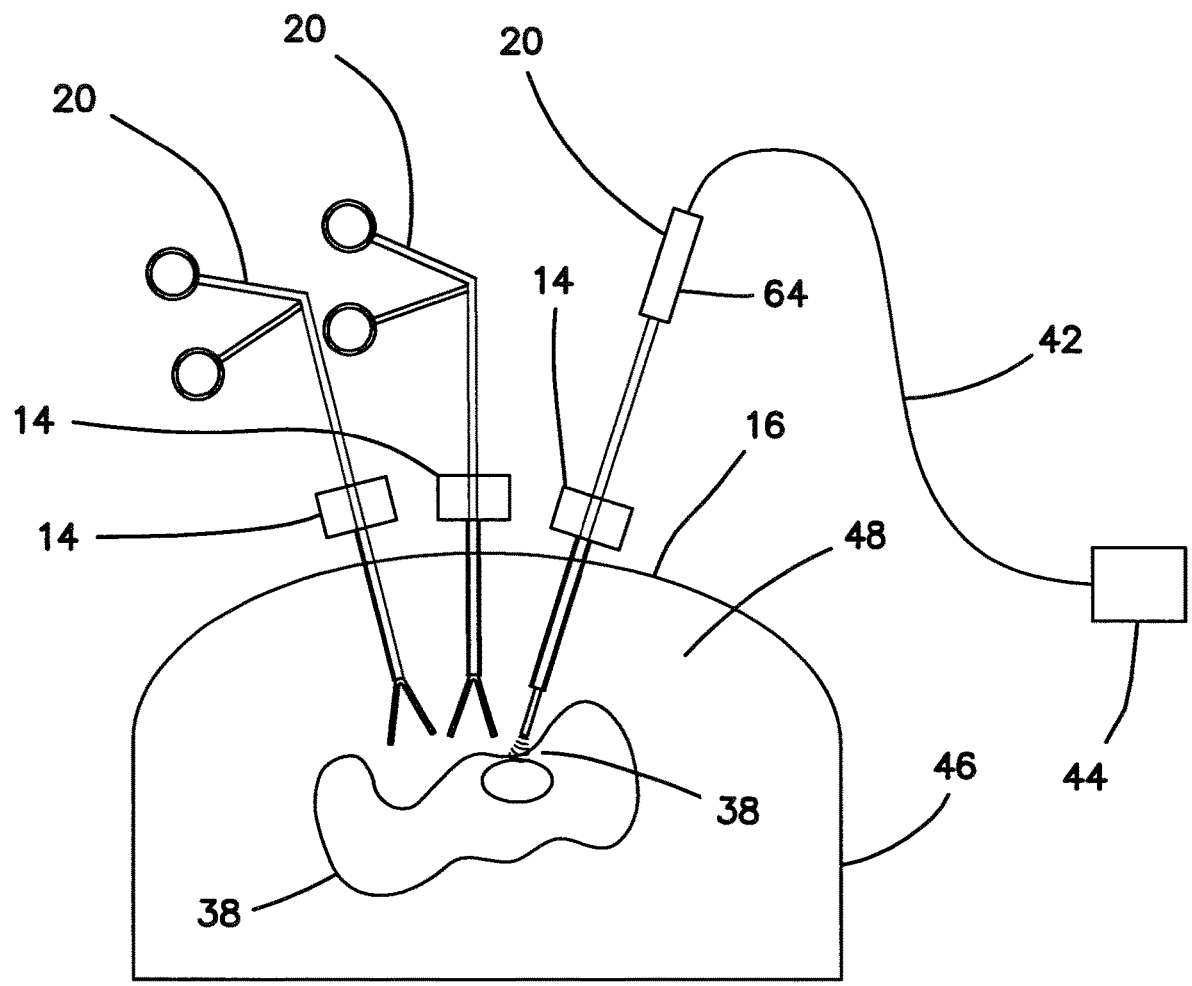
FIG. 3 is an illustration of a laparoscopic training module with simulated energy-based surgery according to the present invention.

FIG. 3 illustrates synthetic simulated tissue 38 organ components arranged within a simulated training module or laparoscopic trainer 46 instead of a large mannequin shown in FIG. 2. A laparoscopic trainer 46 may comprise a structure that simulates a specific portion of a physical anatomy. For example, FIG. 3 illustrates a human abdominal section or body cavity 48 where a simulated tissue 38 internal organ is placed or suspended within a hollow structure and at least a portion of the simulated tissue 38 internal organ is obscured from direct visualization by the clinician so that laparoscopic techniques can be practiced. An exemplary laparoscopic trainer 46 is described in co-pending U.S. patent application Ser. No. 13/248,449 entitled "Portable laparoscopic trainer" filed on Sep. 29, 2011 and incorporated herein by reference in its entirety as if fully set forth herein. The structure may be rigid or flexible and may be inflated or constructed to simulate an inflated body cavity 48. The laparoscopic trainer 46 includes one or more access port 14 inserted across a body wall 16 for accessing the body cavity 48 with various surgical instruments 20 and an energy-based simulation heat-generating instrument 64 shown connected to a power source 44 via wire 42 and directed towards target meltable synthetic simulated tissue 38. The access port 14 provide a minimally invasive means to access the target surgical site within the patient while maintaining pneumoperitoneum deliberately created in real laparoscopic surgery or simulated by the body wall 16 of the laparoscopic trainer 46.

Figure 4:
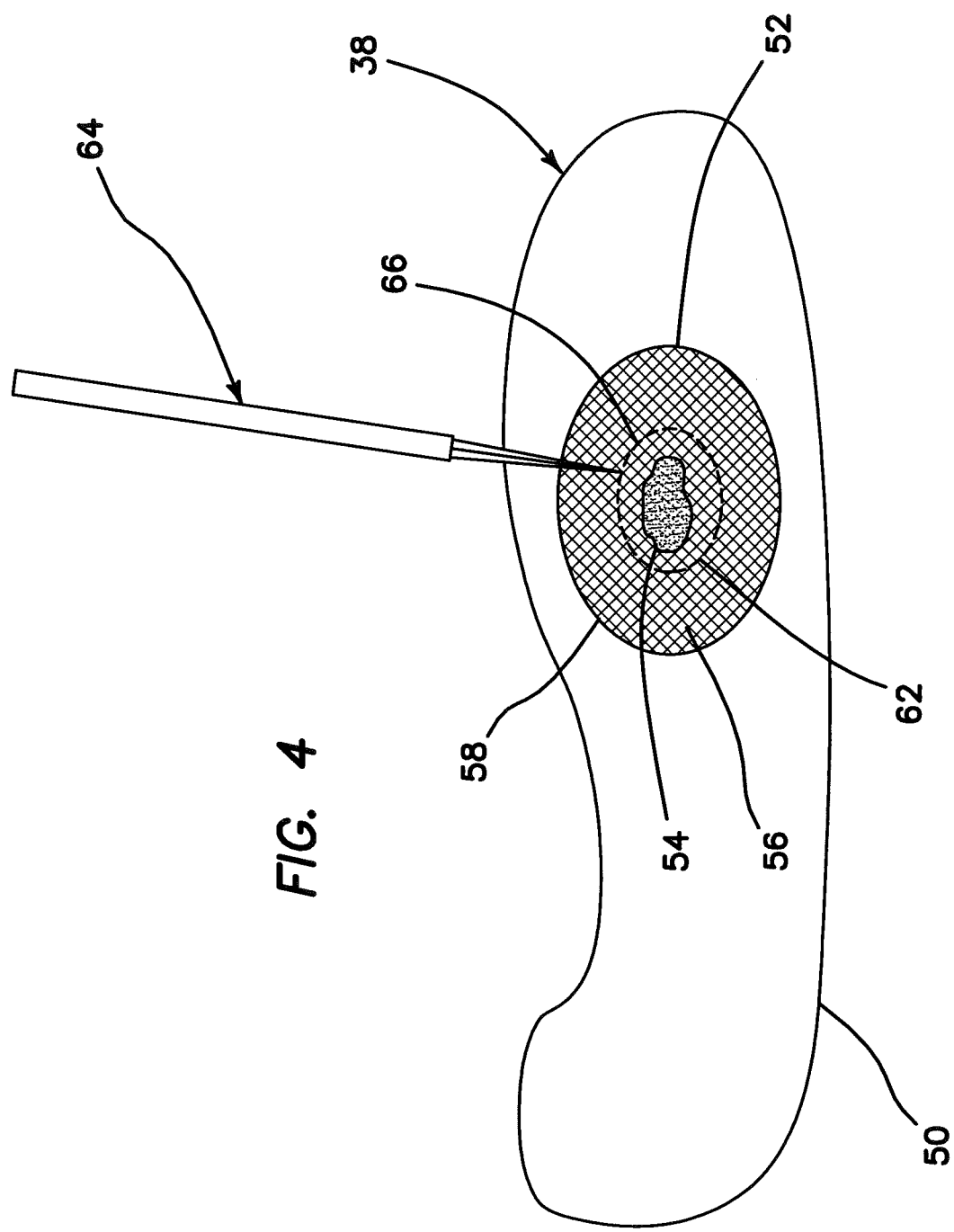
FIG. 4 is a perspective view of a synthetic organ combination and energy-based surgical unit for use with simulated energy-based surgery according to the present invention.
Figure 5:
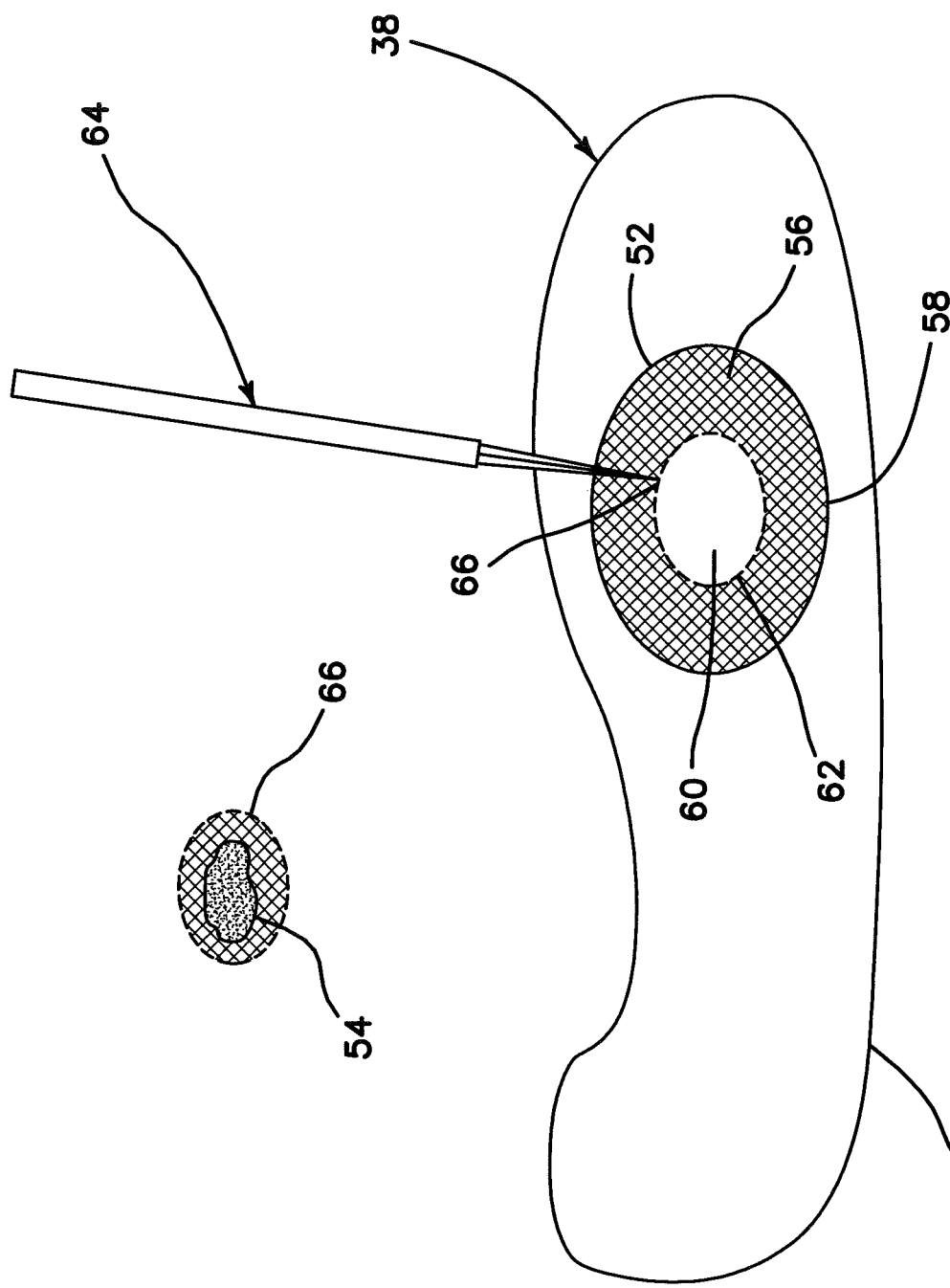
FIG. 5 is a perspective view of a synthetic organ combination with a portion of synthetic tissue removed and an energy-based surgical unit according to the present invention.
Figure 6:
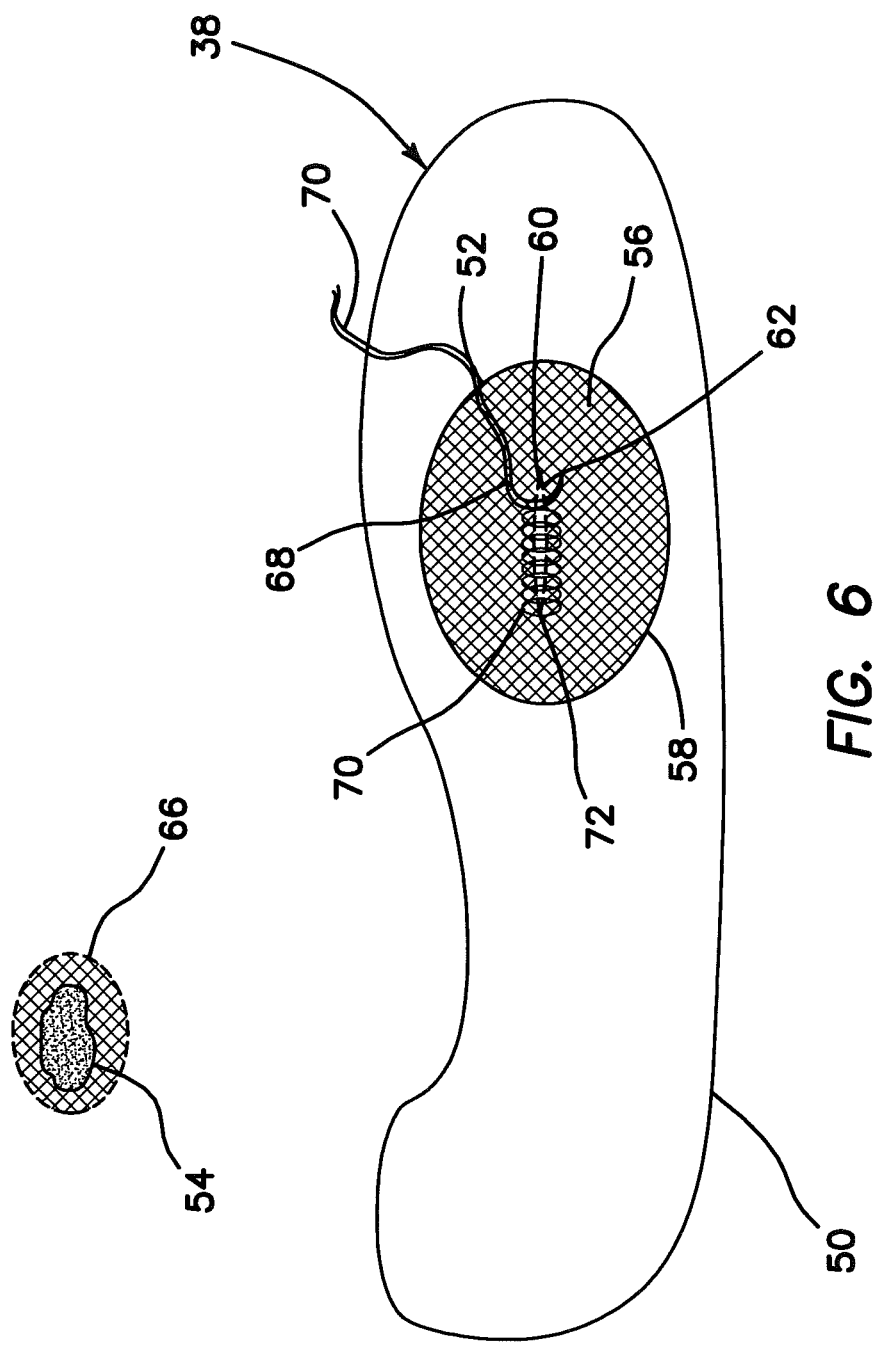
FIG. 6 is a perspective view of a synthetic organ combination with a portion of synthetic tissue removed and a suture closing the excised area of synthetic tissue according to the present invention.

With reference to FIGS. 4-6, a combination of synthetic tissue components comprises a base material 50 connected to a subject material 52 connected to a target material 54. A preferred base material 50 may include a non-meltable elastomeric such as silicone rubber, natural rubber, polyisoprene, any of a variety of polymers with elastic properties or the like or otherwise having a relatively high melting temperature compared to the subject material 52. Generally, the non-meltable polymer materials are referred to as thermosets or materials that permanently harden or solidify upon being heated or cured. The subject material 52 comprises a meltable material such as vinyl, polyester, nylon, spandex blend, LYCRA® brand synthetic elastic fiber or the like having a melting temperature relatively lower than the base material 50. The subject material 52 is selected according to the desired characteristics such as melt-temperature, flexibility and adhesion properties. The target material 54 is either meltable or non-meltable and is configured to be solid or hollow and may be filled with fluid or additional material. As an example, a base material 50 is shaped to represent an internal organ made of silicone rubber. This base material has a very good tolerance to high temperature and has a melting temperature higher relative to the subject material 52. A subject area 56 comprises subject material 52. In one variation, the subject area 56 comprises a section of meltable, thermoplastic material that melts at a specific temperature and may include a mesh or fabric material molded or embedded in the plastic. Thermoplastic materials may be repeatedly made soft and hard by heating and cooling. The subject material 52 is attached to the base material 50 and is colored to match or contrast with the base material 50. One variation of subject material 52 comprises a performance material or mesh woven to be stretchable in at least two directions and having an interlocking weave that prevents unraveling when the subject material 52 is cut or melted. The performance material or mesh fabric subject material 52 is attached to the polymer base material 50 along the circumference or perimeter 58 of subject material 52 so that when the subject material 52 is cut or melted, a pocket region or gap 60, shown in FIGS. 5 and 6, is created between the subject material 52 and the base material 50 or all the way through one or more of the subject material 52 and base material 50. In one variation, the target material 54 comprises a form or structure that resembles a lesion, tumor or other target structure that is to be excised from the subject material 52. For the purposes of training surgical candidates in specific procedures, the target material 54 may comprise a structure or form made of non-meltable, thermoset material such as silicone rubber or otherwise having a melting temperature relatively higher than the subject material 52. The structure or form of the target material 54 is solid or hollow and may be filled with fluid or other material. In an alternative variation, the target material 54 is made of a thermoplastic having the same or higher melting temperature relative to the subject material 52. The target material 54 is attached to the subject material 52 so that the target material 54 may be excised by melting the surrounding or encompassing subject material 52 making the target material 54 capable of being removed relative to the subject material 52. The simulated tissue is configured such that the subject material 52 is sufficiently large and encompassing so as to leave a margin 62 of subject material 52 attached to the base material 50 that may be subsequently resolved by suturing or stapling. In one variation, the subject material 52 includes a thermoplastic material molded over a woven, fabric, or mesh material such as nylon or cheesecloth so that the integrated mesh provides structural support or reinforcement especially useful when suturing or resolving a gap created by the excision. Any one or more of the base material 50, subject material 52 and target material 54 can include a fabric or mesh reinforcement combined with a polymer. The mesh support aids in preventing the suture, staple, or suture needle from tearing through at least one of layers when the suture is pulled to close the remnant gap after at least a portion of target material 54 is excised. The subject material 52 may additionally comprise a thermoplastic material formed or woven in such away that it emulates living tissue. Living tissue stretches in all lateral directions so that when cut or incised, it may be approximated by means of suture or staple. The preferred woven construction of the subject material 52 allows a user to suture or staple a defect as shown in FIG. 6 following excision of the target material 54 as would be the case in living tissue. In one embodiment, the subject material 52 is melted with a heat-generating instrument 64 or handpiece that is configured in the form of any real electrosurgical medical device that delivers heat sufficient to melt the non-conductive subject material 52 instead of a real electrosurgical charge to conductive tissue structure, said heat delivered by the heat-generating instrument 64 being sufficient to melt the thermoplastic or other polymer having a lower relative melting temperature to simulate an energy-based cutting technique. The subject material 52 is melted along a path line 66, for example, that circumscribes the target material 54 that is shaped as a tumor or defect to be excised. The melted circumscribed path line 66 advantageously prevents woven material from unraveling after being divided. The subject material 52 is configured around the foreseen target material 54 or otherwise along a predetermined or preselected pathway that is surgically significant for training purposes. The thusly created gap 60 as a result of the melting away of subject material 52 is seen in FIG. 5 and this gap 60 or defect may be closed, stapled or sutured. FIG. 6 illustrates a standard suture needle 68 and suture 70 forming a row of sutures 72 closing the gap 60. The simulation device not only allows the user to practice energy-based surgical techniques but also advantageously allows for the additional practice of suturing and stapling techniques as would be the case in a real non-simulated living tissue surgery.

Figure 7:
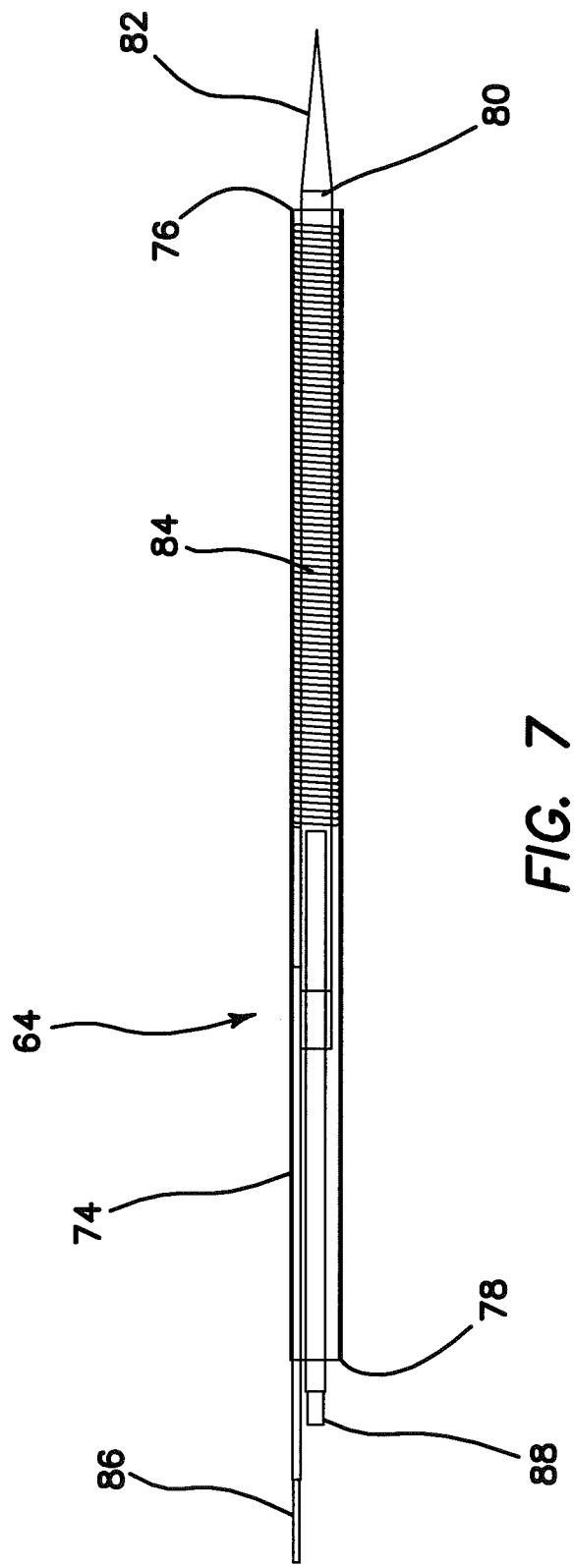
FIG. 7 is a semi-transparent side view of a simulated energy-based surgical unit according to the present invention.

With reference now to FIG. 7, a heat-generating instrument 64 is illustrated that is sized and configured to simulate an energy-based surgical instrument in a training environment. The heat-generating instrument 64 comprises an elongate tubular body 74 having a distal end 76 and a proximal end 78, and a cylindrical wall defining a lumen. The heat-generating instrument 64 comprises an electrically conductive and elongate heat-conductive probe member 80 disposed inside the lumen and having an exposed probe tip 82 sized and configured to simulate an energy-based surgical instrument. The heat-conductive probe member 80 is surrounded by an electrical heating coil 84 that is electrically insulated from the heat-conductive probe member 80. The distal end of the heating coil 84 is connected to the heat-conductive probe member 80 at one point. The proximal end of the heating coil 84 may be connected to a first electrical pole at a power source 44 seen in FIG. 2. The proximal end of the elongate heat-conductive probe member 80 is connected to a second electrical pole of a power source 44. In the circuit, current from a first electrical pole of a power source 44 is conducted through a wire 86 within the lumen of elongate tubular body 74 to the proximal end of the heating coil 84, returning through the heat-conductive probe member 80 to a wire 88 connected to a second electrical pole of a power source 44. In one embodiment, the heating coil 84 is constructed of high resistance, electrically-conductive element or wire made of nickel-chromium, for example, that is wound around the elongate heat-conductive probe member 80 to form a heating coil 84. The number of windings forming the heating coil 84 may be adjusted by a formula that yields a preferred temperature supplied by a preferred voltage according to the resistance (in Ohms) of the wire used to construct the heating coil 84. A preferred power source 44 may, for example, comprise 3 volt direct current supplied by a battery or power transformer. The heating element or heating coil 84 may comprise, for example, a coil having a resistance of 260 Ohms resulting in an active exposed probe tip 82 temperature of approximately 500 degrees Fahrenheit. An alternate construction of the heating coil 84 comprises a length of tungsten or other high resistance material connected to the opposite terminals of a power source 44 where a portion of the material extends beyond the connected portion to form a heated active tip. Although the heat-generating instrument 64 is shown to have a pencil shape, the invention is not so limited and the heat-generating instrument 64 can have the form of any energy-based medical device.

In another variation, the synthetic tumor bed subject material 52 is configured such that it may be cut with a sharp knife or scissor. The simulation in this embodiment allows the user to cut or excise the target material 54 from the same viewpoint or perspective as an electrosurgical arrangement. In addition, this alternate embodiment generates the same visual and tactile feedback as an electrosurgical arrangement. In addition, the tumor-base material 52 is woven or includes a mesh or fabric material embedded in polymer as described above so as not to unravel as it is cut or incised. The interlocking weave allows the user to approximate and close the resultant gap 60 created by the cut or incision with suturing or stapling as is seen in FIG. 6.

Figure 8:
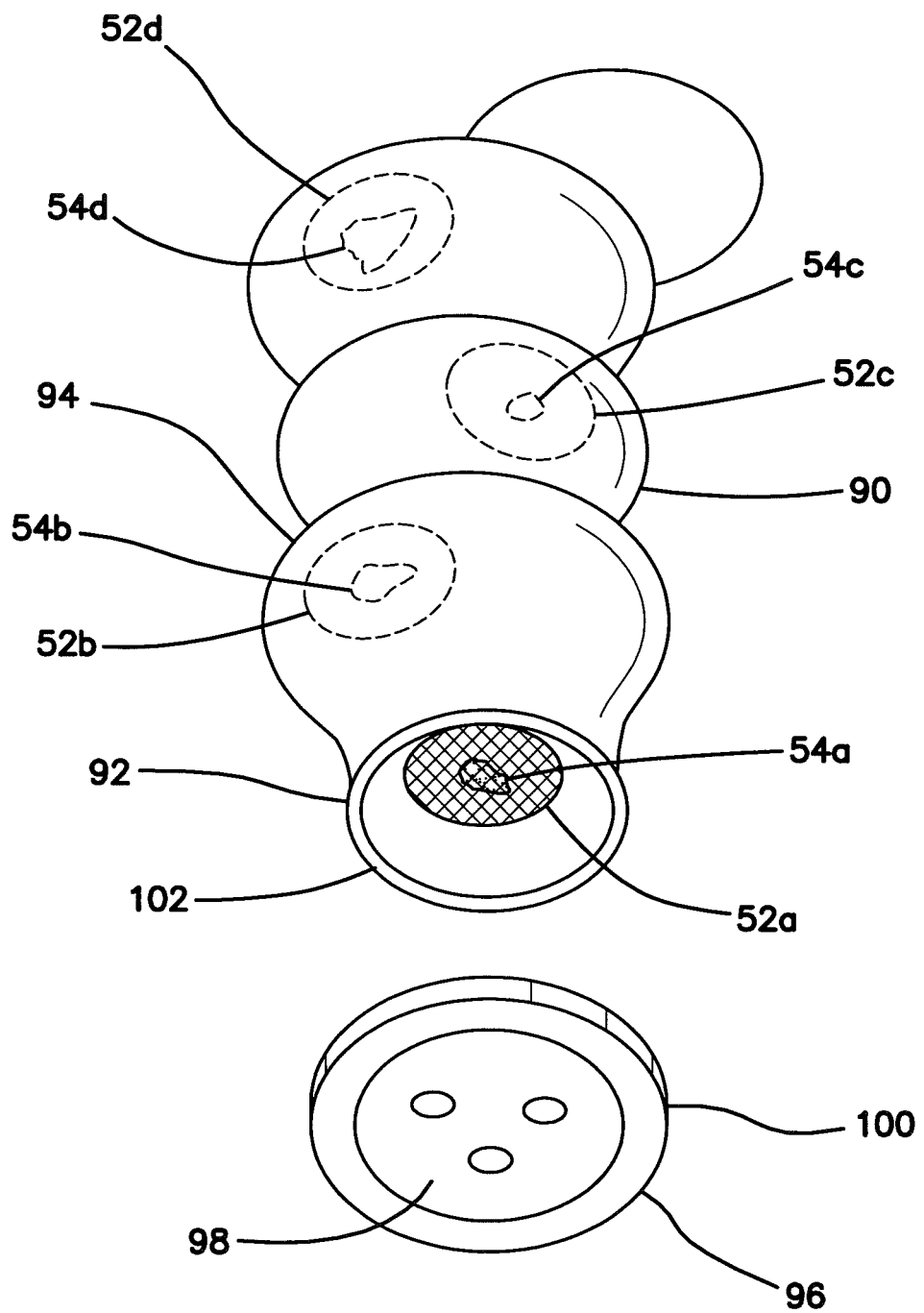
FIG. 8 is a perspective view of a synthetic organ combination with an arrangement of synthetic tumors within a synthetic body conduit and an access port according to the present invention.

Referring now to FIG. 8, an arrangement of a plurality of synthetic tumor-beds of subject material 52a, 52b, 52c, 52d is seen within a synthetic body conduit 90. In this example, the body conduit 90 is a simulated human rectum 92 and a portion of sigmoid colon 94. The body conduit 90 is constructed of an elastomeric material such as silicone rubber that is not meltable by the temperatures generated by the heat-generating instrument 64. The tumor beds of subject material 52a, 52b, 52c, 52d are constructed of a woven or mesh/fabric embedded polymeric material selected to be meltable by the simulated energy-based heat-generating instrument 64. Synthetic tumors of target material 54a, 54b, 54c, 54d are placed upon or beneath the tumor beds of subject material 52a, 52b, 52c, 52d, respectively. The tumors of target material 54 are formed from a material having a melting temperature that may or may not be meltable by the temperature generated by the simulated energy-based heat-generating instrument 64 of the present invention. Care by the clinician involves approximating or circumscribing the tumor with the heat-generating instrument 64 so as not to melt the target material 54. Endoluminal surgical instruments may be used to excise the tumors of target material 54 from the tumor beds of subject material 52a, 52b, 52c, 52d.

In one variation, the body conduit 90 is constructed to simulate an insufflated conduit. A seal member 96 having a penetrable gel layer 98 within a ring 100 of rigid plastic as seen in FIG. 8 may be placed at the proximal opening 102 of the body conduit 90 to more realistically emulate an actual surgical arrangement for the practice of transanal endoscopic microsurgery techniques.

Synthetic materials are used to create a simulated tissue 38 model for training or demonstrating energy-based surgical techniques where a first base material 50 comprises a non-meltable material such as silicone rubber, natural latex, polyisoprene rubber, thermoset or other material that can withstand an elevated temperature or have an otherwise higher melting temperature relative to the meltable subject material 52. A second woven or non-woven meltable subject material 52 is attached to a first base material 50 as desired to simulate a surgical subject area 56. For instance, an abdominal training or demonstration simulation tissue 38 may comprise a sheet of non-meltable base material 50 covered with a sheet of meltable subject material 52. The meltable subject material 52 may be cut/melted as desired with a heat-generating instrument 64 having a cutting exposed probe tip 82 as would be the case with a real energy-based surgical instrument. Alternately, the first base material 50 comprises a meltable material that may also be cut or incised using a heated heat-generating instrument 64. The meltable first base material 50 may be chosen from a variety of materials that melt at the same temperature as the second woven meltable material or at alternate temperatures, higher or lower with the target material being painted/dyed in a shape or color to simulate a tumor or other tissue structure desired to be excised from the rest of the simulated tissue. Using materials of varying melt temperatures may provide the user with a more realistic emulation of actual electrosurgical effects. Table 1 is an exemplary list that is not comprehensive of materials and their respective melt temperatures. The materials in Table 1 have varying melt temperatures and one or more materials from the table can be combined to form a tissue structure of the present invention. They are combined as a first material having a high melting temperature and a second material having a lower melting temperature relative to the first material. The simulated energy-based surgical instrument is accordingly configured to deliver heat sufficient to melt the first material yet insufficient to melt the second material. In another variation, the temperature of the instrument creates a desired thermoplastic deformation in the first material that is differentiated from the effect created when the instrument is placed adjacent or in contact with the second material. The effect may be differentiated in the second material in a variety of ways such as not being meltable or plastically deformable like the first material. The simulated energy-based surgical instrument may also be configured to be capable of preselecting, setting or dialing-in the desired temperature generated by the simulated instrument. Of course, it is within the scope of the present invention to use the same material throughout the tissue structure and a simulated energy-based surgical instrument that delivers the appropriate temperature to melt said same material for the practice of energy-based techniques such as practicing to excise the target areas by avoiding or circumscribing target areas and melting the surrounding margin for removal of the target area. In such a case, the target areas are denoted by differences in tissue structure color, shape and/or other markers to visually identify to the trainee a tumor, lesion or other target tissue or path to be followed for a successful clinical outcome.

TABLE 1

| Material | Degrees (F.) |
| --- | --- |
| Acetal (CoPo) | 400 |
| Acetal (HoPo) | 425 |
| Acrylic | 425 |
| Acrylic (Mod) | 500 |
| ABS (MedImp) | 400 |
| ABS (HiImpFR) | 420 |
| CelAcetate | 385 |
| CelButyrate | 350 |
| CelPropionate | 350 |
| EVA | 350 |
| LCP | 500 |
| Nylon (6) | 500 |
| Nylon(6/6) | 525 |
| Polyamide-imide | 650 |
| Polyarylate | 700 |
| PBT | 500 |
| PCT | 580 |
| Peek | 720 |
| PET | 540 |
| Polycarbonate | 550 |
| Polyetherimide | 700 |
| Polyethylene (LD) | 325 |
| Polyethylene (HD) | 400 |
| Polypropylene | 350 |
| Polystyrene (GP) | 350 |
| Polystyrene (MI) | 380 |
| Polystyrene (HI) | 390 |
| Polysulfone | 700 |
| PPO | 575 |
| PVC (Rigid/Flex) | 350/325 |
| TFE | 600 |

The synthetic simulated tissue 38 comprises at least one or more areas of thermoplastically deformable material. The heat-generating instrument 64 is shaped as a real energy-based medical device such as a blade, scissors, or forceps. The heat-generating instrument 64 is connected to a power source 44 and configured to generate heat in at least one part of the heat-generating instrument 64 such as the exposed probe tip 82 of the heat-generating instrument 64. The heat-generating instrument 64 is used and manipulated by the trainee who can place it in juxtaposition or in contact with the synthetic simulated tissue 38 to perform or practice a simulated surgical technique to create the desired clinical effect for training purposes. The desired clinical effect is achieved as a result of the user's manipulation of the electrode heat-generating instrument 64 relative to the synthetic simulated tissue 38. For example, placing the electrode exposed probe tip 82 near, adjacent, in juxtaposition or in contact with at least one area of thermoplastically deformable material of the synthetic simulated tissue 38 creates local heating of the at least one area of thermoplastically deformable material. The duration which the user keeps the heat-generating instrument 64 in juxtaposition to the at least one area will also affect the simulated clinical outcome. Local heating in the at least one area of thermoplastically deformable material is effected until the thermoplastically deformable material softens. Once softened, the user may subject the at least one area of thermoplastically deformable material to a pressure with the heat-generating instrument 64 that is high enough to cause further deformation at the heated location of the at least one area of thermoplastically deformable material. The degree of deformation is governed by the duration, intensity of pressure applied with the instrument, the temperature of the heat-generating instrument 64 and type of material. The pressure applied with the instrument in combination with the softening as a result of localized heating creates a mechanical rupture of the material relative to the surrounding material. An amorphous plastic will go through a series of phases. Upon the application of heat, the plastic molecules will begin moving and the material will change from a hard substance to a softer substance and transition to a liquid before eventual degradation. The point at which the substance becomes a liquid is the glass transition phase which may be at a temperature significantly below the material's melting temperature. For a crystalline material, the molecules will begin to move when the temperature is close to the melting point of the material. Manipulation and selective deformation, heating, softening and melting of the synthetic simulated tissue 38 of the present invention permits the user to practice various simulated energy-based effects such as coagulation, vaporization, ablation and cutting and is a function of how the surgeon holds the heat-generating instrument 64 with respect to the simulated tissue 38. Holding the heat-generating instrument 64 in close proximity to the tissue to effect local heating and deformation versus activating while in direct contact of the heat-generating instrument 64 with synthetic simulated tissue 38 allows the user to achieve a wide variety of effects at a given temperature output of the heat-generating instrument 64. The instrument temperature preset or adjusted to aid in simulating other clinical effects such as fulguration, desiccation and ablation.

In one variation, the at least one area of thermoplastically deformable material is adjacent to at least one other area of thermoplastically deformable material that has a relatively higher melting, softening or glass transition temperature. In another variation this at least one other area is not thermoplastically deformable. Hence, the synthetic simulated tissue 38 is a combination of two or more materials of relative deformation characteristics. These relative deformation characteristics may include differences in the materials themselves, their thicknesses, melting temperatures, glass transition temperatures and the like. The combination of materials is pre-arranged to predefine a surgical pathway to be followed by the surgeon for example in circumscribing with the heat-generating instrument 64 a synthetic tumor or completely melting a synthetic tumor in the practice of ablating a tumor. The predetermined surgical pathway is formed of a first material that is thermoplastically deformable/meltable relative to a second material. In one variation, the first material is a thermoplastic and the second material is a thermoset. In another variation, the first and second materials are both thermoplastics with the first material having a lower melting temperature than the second material and the simulated instrument being configured to deliver heat sufficient to melt the first material. At least a portion of the first material forms the predefined surgical pathway that also defines a successful or desired clinical outcome based on the anatomy of the tissue structure or the skill or technique desired to be taught to the user with a particular synthetic tissue model. In one variation, the predetermined pathway formed in at least a portion of the first material is flanked on at least one side by the second material. The at least two materials are configured in the simulated tissue such that their relative thermoplasticity defines a predetermined surgical pathway of a desired clinical outcome to be trained. The predetermined surgical pathway defined in or by the first material by itself or relative to the second material is not visible to the user on the basis of any visible characteristics inherent in the first material alone relative to the second material. Instead, other anatomical markers such as colors, markings or shapes on the first and second materials provide visual indication to the user of the path to follow in order to achieve a successful clinical outcome intended in the training simulation. Tactile feedback is provided advantageously when the user touches a portion of the second material with the heat-generating instrument 64 and feels that the second material is relatively harder or not melting as readily as the first material. With such sensory feedback, the user can quickly determine that he/she has veered off the desired clinical pathway, visually confirm the desired pathway and redirect the heat-generating instrument 64 to the location of desired clinical outcome. A pocket fillable with liquid that simulates blood or other body fluid can be formed in the simulated tissue structure and configured such that rupture of the pocket will result in liquid inside the pocket escaping. An event in which the pocket is ruptured can indicate an adverse clinical event.

Mastery of electrosurgery and other energy-based surgical techniques remains a fundamental skill in the repertoire of the accomplished surgeon. The simulation system and method of the present invention provide a realistic, easy and safe way develop this skill. Many alterations and modifications may be made by those having ordinary skill in the art without departing from the spirit and scope of the invention. For these reasons, the above description should not be construed as limiting the invention, but should be interpreted as merely exemplary of the embodiments.

We claim:

1. A system for simulating electrosurgical procedures, comprising:
   a non-electrically conductive simulated tissue structure comprising:
      a first material having a first melting temperature,
      a second material connected to the first material, and
      a surgical pathway configured to guide a user along a path indicating where to melt the first material in accordance with an electrosurgical procedure, wherein:
         the surgical pathway is defined via the first material being flanked on at least one side by the second material,
         the surgical pathway is not visible by the user,
         the surgical pathway is configured to be located by the user via one or more anatomical markings associated with the first and second materials, and
      the first material and the second material are configured such that the second material is removable from the first material upon melting at least a portion of the first material along the surgical pathway; and
   a heat-generating non-electrosurgical instrument in the shape of a laparoscopic electrosurgical instrument configured to simulate electrosurgery with the non-electrically conductive simulated tissue structure by delivering heat at the first melting temperature to melt the first material.

2. The system of claim 1 wherein the simulated tissue structure includes a pocket formed in part by the first material; and wherein the pocket contains a liquid.

3. The system of claim 1 wherein the first material is a thermoplastic and the second material is a thermoset.

4. The system of claim 1 wherein the second material has a second melting temperature that is higher than the first melting temperature.

5. The system of claim 1 wherein the first material and the second material are thermoplastics.

6. The system of claim 1 wherein the second material has a transition temperature that is higher than the first melting temperature.

7. The system of claim 1, wherein the second material is configured to be removed from the first material once the first material along the pathway has been melted.

8. The system of claim 1, wherein the surgical pathway is further configured to provide user feedback indicating when the user has veered off the surgical pathway while melting the first material.

9. The system of claim 1, wherein the heat-generating non-electrosurgical instrument further comprises a power source, the power source being either an alternating current source or a direct current source.

10. The system of claim 9, wherein the power source further comprises a battery that resides in a handle of the heat-generating non-electrosurgical instrument.

11. A system for simulating electrosurgical procedures, comprising:
a non-electrically conductive simulated tissue structure comprising:
a first material having a first melting temperature;
a second material connected to the first material; and
a surgical pathway configured to guide a user along a path indicating where to melt the first material in accordance with an electrosurgical procedure, wherein:
the surgical pathway is not visible by the user,
the surgical pathway is configured to be located by the user via one or more anatomical markings associated with the non-electrically conductive simulated tissue structure; and
the first material and the second material are configured such that the second material is removable from the first material upon melting at least a portion of the first material along the pathway; and
a heat-generating non-electrosurgical instrument in the shape of a laparoscopic electrosurgical instrument configured to simulate electrosurgery with the non-electrically conductive simulated tissue structure by deliver heat at the first melting temperature to melt the first material.

12. The system of claim 11 wherein the first material is a thermoplastic and the second material is a thermoset.

13. The system of claim 11 wherein the first material and the second material are thermoplastics.

14. The system of claim 11 further comprising a third material having a third melting temperature higher than the first melting temperature, the third material connected to the first material, and wherein the third material is configured to represent an organ.

15. The system of claim 11 further comprising a third material having a third melting temperature higher than the first melting temperature, the third material connected to the first material, and wherein the third material is connected to the first material along a perimeter of the first material.

16. The system of claim 11 further comprising a laparoscopic trainer configured to receive the non-electrically conductive simulated tissue structure, wherein the laparoscopic trainer houses the non-electrically conductive simulated tissue structure within an internal space thereby obscuring a direct visualization of the non-electrically conductive simulated tissue structure located within the internal space from the user.

17. The system of claim 16, wherein the laparoscopic trainer further comprises an indirect visualization capture device that the user relies on to find and navigate the surgical pathway when performing a simulated electrosurgical procedure, and that captures images of the non-electrically conductive simulated tissue structure obtained from within the laparoscopic trainer and a display screen that the user views indirect visualizations of the non-electrically conductive simulated tissue structure provided by the captured images.

18. The system of claim 11, wherein the heat-generating non-electrosurgical instrument has a shape of a laparoscopic electrosurgical grasper.

19. The system of claim 11, wherein the heat-generating non-electrosurgical instrument comprises an electrically insulated electrical heating coil.

20. A system for simulating electrosurgical procedures, comprising:
a non-electrically conductive simulated tissue structure comprising:
a first material having a first melting temperature and forming a first layer,
a second material connected to the first material, wherein the second material forms a second layer connected to the first layer such that the first layer surrounds or encompasses the second layer,
a third material having a third melting temperature that is higher than the first melting temperature, the third material forming a third layer connected to the first layer, and
a surgical pathway configured to guide a user along a path indicating where to melt the first material in accordance with an electrosurgical procedure, wherein:
the surgical pathway is not visible by the user,
the surgical pathway is configured to be located by the user via one or more anatomical markings associated with the non-electrically conductive simulated tissue structure,
the first material and the second material are configured such that the second material is removable from the first material upon melting at least a portion of the first material along the pathway; and
a heat-generating non-electrosurgical instrument in the shape of a laparoscopic electrosurgical instrument configured to simulate electrosurgery with the non-electrically conductive simulated tissue structure by delivering heat at the first melting temperature to melt the first material.

21. The system of claim 20 wherein the second layer is located above the first layer.

22. The system of claim 20 wherein the second layer is located between the first layer and third layer.

23. The system of claim 20 wherein the third material is configured to represent an organ.

24. The system of claim 20 wherein the third material is connected to the first material along a perimeter of the first material.

25. The system of claim 20, wherein the heat-generating non-electrosurgical instrument comprises an electrically conductive and elongate heat-conductive probe member, wherein the probe member is disposed inside a lumen of the heat-generating non-electrosurgical instrument, and wherein a portion of the probe member is exposed.

26. The system of claim 25, wherein the probe member is surrounded by an electrical heating coil that is electrically insulated from the probe member.

27. The system of claim 26, wherein a distal end of the electrical heating coil is connected to the probe member, and a proximal end of the electrical heating coil is connected to a power source.

28. The system of claim 26, wherein the electrical heating coil is a high resistance, electrically-conductive element or wire.

29. The system of claim 26, wherein a number of windings forming the electrical heating coil is adjusted to provide a pre-determined temperature from an attached power source.

\* \* \* \* \*